Jan. 1, 1957 J. V. CALTAGIRONE ET AL 2,776,145

PHONOGRAPH TABLET TABLES

Filed Jan. 23, 1952

INVENTORS
JOSEPH V. CALTAGIRONE
AUGUST NICHOLS
BY Henry M. Chapin
ATTORNEY

United States Patent Office 2,776,145

Patented Jan. 1, 1957

2,776,145

PHONOGRAPH TABLET TABLES

Joseph V. Caltagirone, Brooklyn, and August Nichols, New York, N. Y.; said Nichols assignor to said Caltagirone Application January 23, 1952, Serial No. 267,838

1 Claim. (Cl. 274—39)

Figure 1:
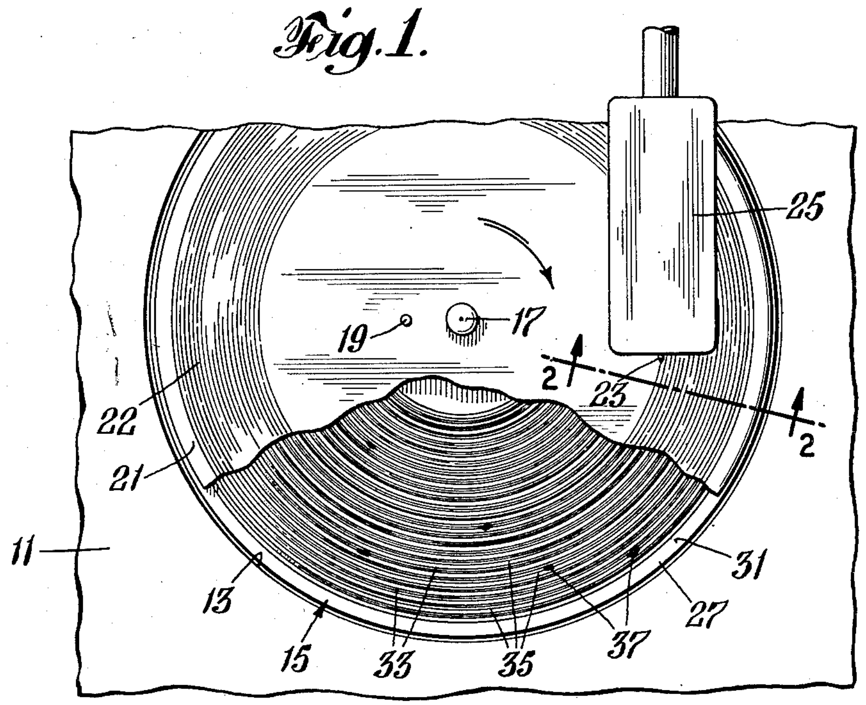

This invention relates to a novel phonograph tablet table which insures improved fidelity when cutting or embossing a record on an extremely thin tablet of flexible plastic material such as vinyl resin.

Formerly phonograph tablets were made from relatively thick and unyielding materials so that tiny foreign particles trapped between the tablet table and the tablet did not affect the recording deleteriously. Now, however, recordings are being made successfully on extremely thin and flexible tablets, for example on tablets made of vinyl plastic only 0.01 inch thick. Some of such trapped particles heretofore have produced slight outward bulges in the thin tablet under the pressure of the recording stylus, so that the fidelity of sound recording has been adversely affected.

Instead of trying to eliminate all foreign particles from the surface of the tablet table, we propose to eliminate the effect of the particles by providing the exposed tablet-supporting surface with a series of closely spaced sharp edged tablet-supporting lands or ridges upon which the tablet rests, and a series of grooves or valleys between the ridges for receiving foreign particles accumulating on the table. With such an improved table the tablet rests securely on the ridges and superior recording fidelity is secured.

Figure 2:
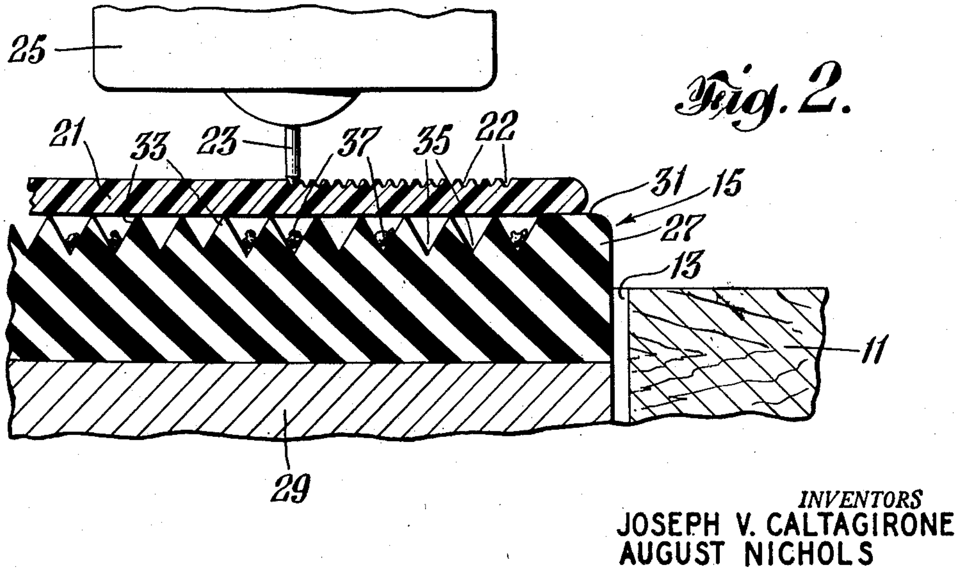

In the drawings:

Figure 1 is a fragmentary plan view of a phonograph embodying the invention, parts being broken away and in section; and Figure 2 is an enlarged sectional view taken along the line 2—2 in Figure 1.

Referring to Figure 1, a phonograph in accordance with the invention comprises a case 11 having an aperture 13 within which is rotatably mounted a tablet table 15 having a central hub 17 and an eccentrically located pin 19.

A thin flexible tablet 21 in the form of a flat disc about 0.01 inch thick is positioned on the table 15 with a pair of holes therein fitting over the hub 17 and pin 19, so that the tablet rotates positively with the table.

A spiral sound track 22 is recorded on tablet 21 by a recording stylus 23 carried in a recording arm 25 which may be moved across the rotating tablet in any conventional way. Stylus 23 has been shown as an embossing stylus, but the principles of the invention also apply when an engraving stylus is used.

Figure 2 shows that tablet table 15 comprises a sheet 27 of rubber or similar soft and resilient material secured by cement to a metal disc 29. The exposed tablet supporting surface 31 of table 15 comprises a plurality of annular sharp edged concentric circular tablet-supporting lands or ridges 33, and a series of grooves or valleys 35 between the ridges for receiving foreign particles 37 which have accumulated on the table. Each of the ridges in cross section has straight sides or edges inclined upwardly toward one another and meeting in a peak, all of said peaks being arranged in a common plane, and the straight sides or edges of adjoining ridges being inclined downwardly toward one another and meeting in a valley. This construction provides rigid support of the thin tablet 21 without permitting foreign particles to bulge it. It is to be understood that ridges 33 and grooves 35 may have other shapes, annular or otherwise, within the scope of the invention.

While the necessary spacing of ridges 33 from one another depends to some extent upon the thinness and flexibility of tablet 21, completely satisfactory results have been obtained with an edge-to-edge spacing of about one sixteenth inch when using vinyl plastic tablets 0.01 inch thick. The principle factor is that the ridges 33 be close enough together to provide rigid support of the particular tablet 21 upon which sound is being recorded, without yielding of the tablet to the pressure of stylus 23 as it passes over the valleys 35.

Persons skilled in the art will readily appreciate that changes in the details of construction can be made without departing from the principles of the invention.

We claim:

A phonograph tablet table for supporting thin flexible records, said table having an exposed tablet supporting surface on substantially the entire exposed area thereof comprising a series of concentric continuous annular ridges spaced sufficiently close together for rigid support of such a record without yielding to stylus pressure, and a series of valleys between said ridges for receiving foreign particles accumulating on said table, said ridges and valleys covering substantially the entire area of said surface, each of said ridges in cross section having straight edges inclined upwardly toward one another and meeting in a peak, all of said peaks being arranged in a common plane, the straight edges of adjoining ridges being inclined downwardly toward one another and meeting in a valley.

References Cited in the file of this patent

UNITED STATES PATENTS

| | | |
|---|---|---|
| 741,247 | Johnson | Oct. 13, 1903 |
| 1,446,289 | Dessau | Feb. 20, 1923 |
| 2,022,293 | Mallina | Nov. 26, 1935 |
| 2,554,919 | Mullaney | May 29, 1951 |
| 2,559,786 | Mueller | July 10, 1951 |